No. 868,312. PATENTED OCT. 15, 1907.
M. A. WILCOX.
BAKE PAN.
APPLICATION FILED OCT. 19, 1905.
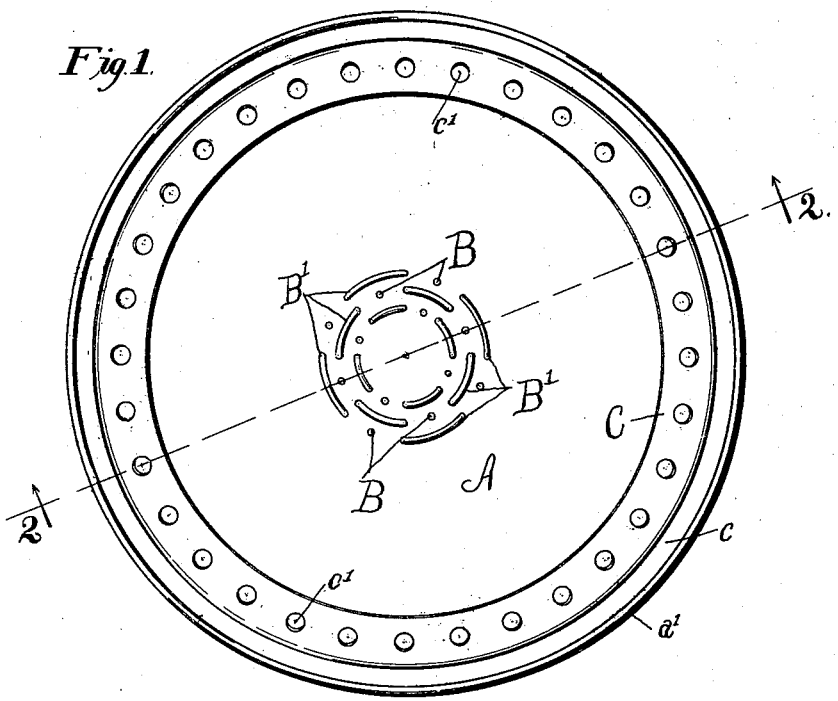
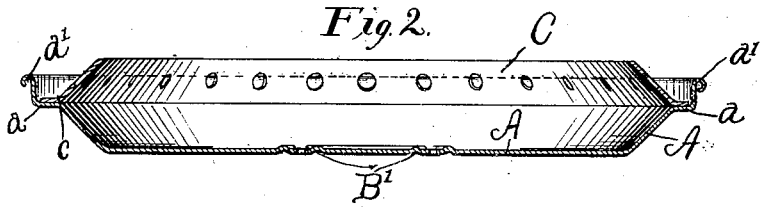
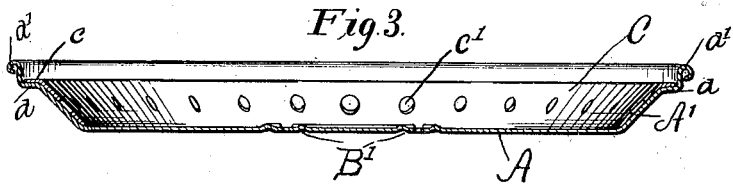
WITNESSES:
Chas. F. Bassett
Leora A. Schriver
INVENTOR
Margaret A. Wilcox.
By
Norman King
ATT'Y.

UNITED STATES PATENT OFFICE.

MARGARET A. WILCOX, OF CHICAGO, ILLINOIS.

BAKE-PAN.

No. 868,312.  Specification of Letters Patent.  Patented Oct. 15, 1907.

Application filed October 19, 1905. Serial No. 283,362.

*To all whom it may concern:*

Be it known that I, MARGARET A. WILCOX, a citizen of the United States, residing at Chicago, in the county of Cook and State of Illinois, have invented certain new and useful Improvements in Bake-Pans, of which the following, taken in connection with the drawing, is a description.

My invention has for its object the production of a bake pan, more particularly a pan in which pies are to be baked, and the same is designed with special reference to producing a device which in its complete form will seal the upper and lower crusts of a pie together and effectually prevent the escape of the juices from the filling of the pie.

In addition to the features of advantage in providing a means for sealing the crusts together, it will be observed that the rim which I have provided for sealing said crusts together is higher than the rim of the pie pan proper. In hotels or restaurants and the like where it is necessary to have on hand a number of pies at one time, as will be observed by the use of my upper rim or cover, one pie can be placed above the other without in any manner crushing the crust of the pie beneath it. In this way much less room is occupied than is possible with the same number of pies when necessary to arrange shelves or casing for the same.

When the pie has been removed from the pan the upper rim may be inverted and nested inside of the pan, and any number of pans may be assembled together and occupy practically the same space as the pans now in common use.

Other novel features of my invention will be hereinafter more fully pointed out and claimed. In the accompanying drawings forming part of this specification, and in which like letters of reference indicate corresponding parts, I have illustrated one form of device embodying the essential features of my invention, although the same may be carried into effect in other ways without in the least departing from the spirit thereof, and in these drawings, Figure 1 is a top plan view of my invention; Fig. 2 is a cross sectional view taken on line 2—2 of Fig. 1; Fig. 3 is a similar sectional view showing the upper rim inverted and nested inside of the pan.

In carrying out my invention A represents the pan provided with the usual flaring rim A′, at the top of which is a circumferential shoulder *a*, and projecting from the outer edge of the shoulder *a* is a vertical rim *a′*.

In the bottom of the pan A I have provided a number of perforations B, also a number of raised surfaces B′. When the crust is in the pan the raised surfaces B′ hold the crust away from the pan sufficiently to permit circulation of air, and by means of the perforations B, the air or steam may escape from the bottom of the pan thereby preventing the under crust from puffing up as is often the case in baking pies in the old style pans.

C is an annular cover or rim which is adapted to fit inside of the rim *a′* and is provided with a circumferential shoulder *c* which is adapted to rest upon the shoulder *a* of the pan A. This upper rim is flared inwardly from the shoulder *c* corresponding to the sides A′ of the pan A. A plurality of perforations *c′* is provided extending around the rim C, through which the steam rising from the edge of the crust may escape, and said perforations also provide a means for the circulation of air when the pies are placed one upon the other.

When preparing a pan for use, the under crust of the pie is first placed in the pan, then the filling, then the upper crust is laid over all in the usual way and the edges of the crust are trimmed off around the edge of the pan and pressed down on the shoulder *a*. The upper rim C is then placed in position holding the edges of the upper and lower crusts between the shoulders *a* and *c*, preventing the juice of the pie from escaping. As the pie begins to bake the edges of the crust are firmly sealed together. The rim C extending above the outer edge of the pie prevents any of the juice from running over the top and escaping from the pan as is often the case with the old style of pie pans. When the pie is placed in the oven, the outer edge thereof being thinner than the center it begins to bake first, which sometimes causes steam to gather beneath the under crust. This objection I have overcome by the slightly raised surfaces B′ and perforations B provided in the bottom of the pan, through which any air or steam may escape, thereby allowing the upper and under crusts to bake evenly, and preventing a soggy unbaked under crust, which results when there is steam between the under crust and the bottom of the pan.

The advantages of my invention will be apparent to those skilled in the art.

My improvements are very simple in construction, comprise few parts, can be easily and cheaply manufactured and are effectual in all respects in the performance of their functions.

Slight changes might be made in the details of my invention without departing from the spirit thereof or limiting its scope, and hence I do not wish to limit myself to the exact form and details here shown.

I claim:

In a bake pan, the combination of a pan having perforations and raised surfaces in the bottom thereof, an outwardly flaring rim, a circumferential shoulder, a vertical rim extending from the outer edge of said shoulder, with a removable circular perforated rim having a shoulder adapted to rest upon the aforesaid shoulder in the bake pan, said rim flaring in a direction opposite to the outwardly flaring rim in the bake pan, the two rims forming a closure around the outer edge of the pan, substantially as described.

In testimony whereof I have hereunto signed the foregoing specification in the presence of two subscribing witnesses.

MARGARET A. WILCOX.

Witnesses:
 JENNIE L. FISKE.
 CORA A. SCHRIVER.